(12) United States Patent
Zenil et al.

(10) Patent No.: US 11,534,751 B2
(45) Date of Patent: Dec. 27, 2022

(54) WAFER FOR CARRYING BIOLOGICAL SAMPLE

(71) Applicant: OXFORD IMMUNE ALGORITHMICS LTD, Reading (GB)

(72) Inventors: Hector Zenil, Reading (GB); Jürgen Hermann Richard Riedel, Reading (GB)

(73) Assignee: OXFORD IMMUNE ALGORITHMICS LTD, Reading (GB)

( * ) Notice: Subject to any disclaimer, the term of this patent is extended or adjusted under 35 U.S.C. 154(b) by 0 days.

(21) Appl. No.: 17/498,132

(22) Filed: Oct. 11, 2021

(65) Prior Publication Data

US 2022/0193657 A1    Jun. 23, 2022

(30) Foreign Application Priority Data

Dec. 22, 2020 (GB) ...................................... 2020375

(51) Int. Cl.
*B01L 3/00* (2006.01)
*G01N 1/00* (2006.01)

(52) U.S. Cl.
CPC ................ *B01L 3/502* (2013.01); *G01N 1/00* (2013.01); *B01L 2300/0803* (2013.01); *B01L 2400/0406* (2013.01); *G01N 2001/002* (2013.01)

(58) Field of Classification Search
CPC ............ B01L 3/502; B01L 2300/0803; B01L 2400/0406; G01N 1/00; G01N 2001/002

USPC ........................................................ 73/64.56
See application file for complete search history.

(56) References Cited

U.S. PATENT DOCUMENTS

| 4,435,080 A | 3/1984 | Maly et al. | |
|---|---|---|---|
| 8,574,895 B2* | 11/2013 | Freeman | G01N 21/6408 422/402 |
| 2005/0084422 A1* | 4/2005 | Kido | B01L 3/502715 422/547 |

(Continued)

FOREIGN PATENT DOCUMENTS

| CN | 2516990 Y | 10/2002 |
|---|---|---|
| CN | 204256257 U | 4/2015 |

(Continued)

OTHER PUBLICATIONS https://www.ekfdiagnostics.com/quo-test.html. http://web.archive.org/web/20171023160950/https://www.ekfdiagnostics.com/quo-test.html (Year: 2017).*

(Continued)

*Primary Examiner* — Benjamin R Whatley
*Assistant Examiner* — Jacqueline Brazin
(74) *Attorney, Agent, or Firm* — Marshall, Gerstein & Borun LLP

(57) ABSTRACT

A wafer for carrying a biological sample includes a pair of circular discs, at least one of the discs being transparent. The wafer also includes a gap between the discs adapted to receive a biological sample. The compact circular shape of the wafer makes it particularly suited for use in a portable device in which the wafer is rotated to enable a camera to image different areas of the sample between the discs. The gap may be sized to pull a biological sample into the gap by capillary action.

20 Claims, 14 Drawing Sheets

(56) References Cited

U.S. PATENT DOCUMENTS

| | | | |
|---|---|---|---|
| 2008/0094974 A1* | 4/2008 | Worthington | G01N 35/00069 369/53.2 |
| 2009/0117170 A1* | 5/2009 | Kroehne | A61K 9/0024 424/424 |
| 2009/0252651 A1 | 10/2009 | Park et al. | |
| 2012/0156765 A1 | 6/2012 | Wimberger-Friedl et al. | |
| 2018/0246089 A1* | 8/2018 | Chou | G16B 50/00 |

FOREIGN PATENT DOCUMENTS

| | | | | |
|---|---|---|---|---|
| EP | 2219034 A1 | 8/2010 | | |
| GB | 0401514 A | 11/1933 | | |
| GB | 1276730 A | 6/1972 | | |
| WO | WO-96/15450 A1 | 5/1996 | | |
| WO | WO-03065039 A1 * | 8/2003 | ....... | G01N 35/00069 |
| WO | WO-2006118420 A1 | 11/2006 | | |

OTHER PUBLICATIONS

Agarwal, Rahul, et al., "A portable spinning disc for complete blood count (CBC)", *Biosensors and Bioelectronics*, vol. 150, 2020, 111935, ISSN 0956-5663, Nov. 30, 2019.

Intellectual Property Office Search Report issued to Application No. GB1918950.5, dated Mar. 10, 2020.

International Search Report issued in PCT Patent Application No. PCT/GB2021/053376 dated Mar. 10, 2022.

\* cited by examiner

WAFER FOR CARRYING BIOLOGICAL SAMPLE

FIELD OF THE DISCLOSURE

The present invention relates to a wafer for carrying a biological sample, a method of assembling such a wafer, and a method of loading a sample into such a wafer.

The term "wafer" is used herein to refer to a sample carrier which may or may not have a circular periphery.

BACKGROUND

Conventional systems and methods for biological imaging usually require a microscopic setup operated by humans traversing slides in translational movements, or a very expensive technique such as spectroscopy, flow-cytometry, electrical impedance, or chemical assays. Such technologies are unaffordable for applications of high population impact. Such systems and methods also do not scale and generalise well as they require manual analysis and are based on expensive optics and often provide inaccurate or incompatible results.

SUMMARY OF THE DISCLOSURE

A first aspect of the invention provides a wafer for carrying a biological sample, the wafer comprising: a pair of circular discs, wherein at least one of the discs is transparent; and a gap between the discs adapted to receive a biological sample.

The compact circular shape of the wafer makes it particularly suited for use in a portable device in which the wafer is rotated to enable a camera to image different areas of the sample between the discs.

The wafer may have a diameter less than 5 cm. or less than 3 cm.

The gap may be sized to pull a biological sample into the gap by capillary action.

One of the discs may have an opening which provides an inlet into the gap. This may help to load more of the sample into gap, or may help break the surface tension of the sample which make it easier to introduce into the gap.

The opening may comprise a through-hole which extends through a thickness of the one of the discs. Alternatively the opening may comprise a recess, notch or channel in an edge of the one of the discs.

One or more spacers may be provided between the discs, to control the size of the gap.

The one or more spacers may comprise an adhesive tape which joins the discs together.

The one or more spacers may comprise three or more spacers.

Each disc may have a circular periphery at an edge of the wafer.

Both of the discs may be transparent, or one of the discs may be opaque or reflective.

The gap may have a circular open outer periphery at an edge of the wafer. This may enable the sample to be introduced into the gap via the open outer periphery. Alternatively air may escape the outer periphery of the gap as the sample is introduced into the gap at a centre of the wafer or other location.

The circular open outer periphery of the gap may extend around all or most of a circumference of the wafer.

The gap may have a substantially constant size, or the size of the gap may vary—for instance increasing radially to a maximum at a circular open periphery of the gap at an edge of the wafer.

The gap may extend across a full diameter of the wafer.

A size of the gap may vary across the wafer by no more than 10% across the full diameter of the wafer.

The discs may be joined together. For instance the discs may be bonded together by an adhesive, welded together by controlled melting; or joined together by a fastener such as rod which passes through one of the discs with an interference fit.

The discs may have opposed parallel planar surfaces on opposite sides of the gap.

A first one of the discs may have a frustoconical surface on a first side of the gap; and a second one of the discs may have a planar surface on a second opposite side of the gap.

The gap may be an air gap, or it may contain a stain, dye or other reagent.

A size of the gap (for instance a mean size of the gap, a maximum size of the gap, a size of the gap at the open circular outer periphery of the gap, or a size of the gap where the inlet meets the gap) may be less than 200 µm, less than 100 µm, less than 50 µm, less than 20 µm, less than 15 µm or less than 10 µm.

A size of the gap (for instance a mean size of the gap, a maximum size of the gap, a size of the gap at the open circular outer periphery of the gap, or a size of the gap where the inlet meets the gap) may be greater than 1 µm or greater than 2 µm.

A size of the gap (for instance a mean size of the gap, a maximum size of the gap, a size of the gap at the open circular outer periphery of the gap, or a size of the gap where the inlet meets the gap) may be greater than 2 µm and less than 10 µm, making it suitable for carrying a cell multilayer of whole blood.

A size of the gap (for instance a mean size of the gap, a maximum size of the gap, a size of the gap at the open circular outer periphery of the gap, or a size of the gap where the inlet meets the gap) may be or greater than 2 µm and less than 5 µm, making it suitable for carrying a cell monolayer of whole blood.

A second aspect of the invention provides a wafer for carrying a biological sample, the wafer comprising: a pair of plates, wherein at least one of the plates is transparent; and a gap between the plates adapted to receive a biological sample, wherein a first one of the plates has an opening which provides an inlet into the gap, the opening comprises a recess in a face of the first one of the plates, and the recess extends to an edge of the first one of the plates.

Optionally the recess has an outer end at the edge of the first one of the plates; an inner end opposite the outer end; a base which runs between the outer end and the inner end; and an open side opposite the base.

Optionally the recess comprises a tapered recess which becomes progressively shallow away from the edge of the first one of the plates. The recess may become progressively shallow along its full radial extent, or along only part of its radial extent.

Optionally the recess extends radially.

Optionally a second one of the plates has a face which is un-recessed where it faces the recess.

Optionally the recess is a first recess, the wafer further comprises a second recess in a face of the second one of the plates, and the second recess is aligned with the first recess.

Optionally the first one of the plates and/or the second one of the plates is a disc which is circular around at least a majority of its circumference. Alternatively one or both of the plates may have a non-circular edge.

A further aspect of the invention provides a method of loading a biological sample into a wafer according to the first or second aspect, the method comprising introducing the sample into the gap so that the sample is pulled into the gap by capillary action.

The sample may be pulled into the gap by capillary action to form a cell monolayer.

One of the discs may have an opening which provides an inlet into the gap, and the sample may be introduced into the gap via the opening.

The gap may contain a stain, dye or reagent, and the sample may come into contact with the stain, dye or reagent as it is pulled into the gap.

A further aspect of the invention provides a method of assembling a wafer according to the first or second aspect of the invention, the method comprising bringing the plates or discs together to provide the gap between the plates or discs; and fixing the plates or discs together—for instance with an adhesive or an interference-fit fastener.

BRIEF DESCRIPTION OF THE FIGURES

FIG. 27 shows the pair of discs in an unassembled state.

DETAILED DESCRIPTION

Figure 1:
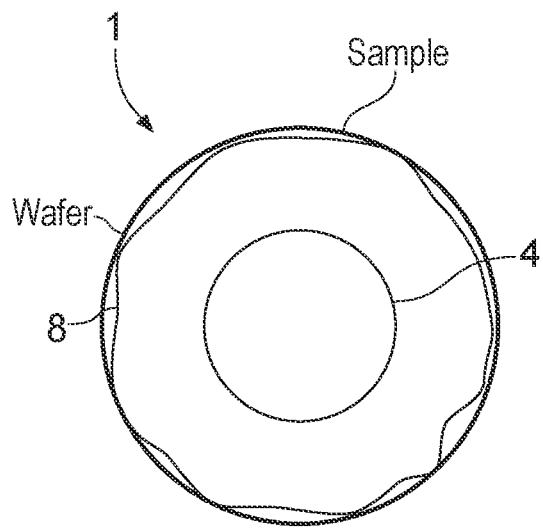
FIG. 1 is a plan view of a wafer.
Figure 2:
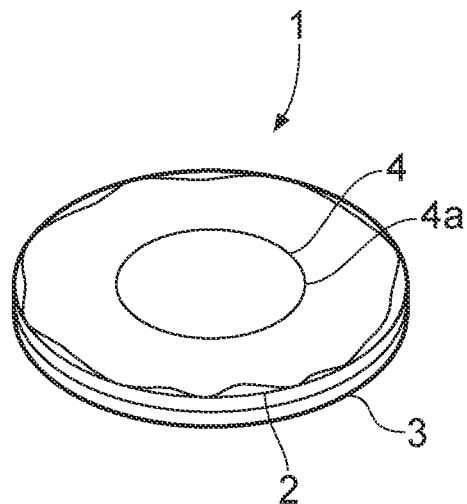
FIG. 2 is an isometric view of the wafer of FIG. 1.
Figure 3:
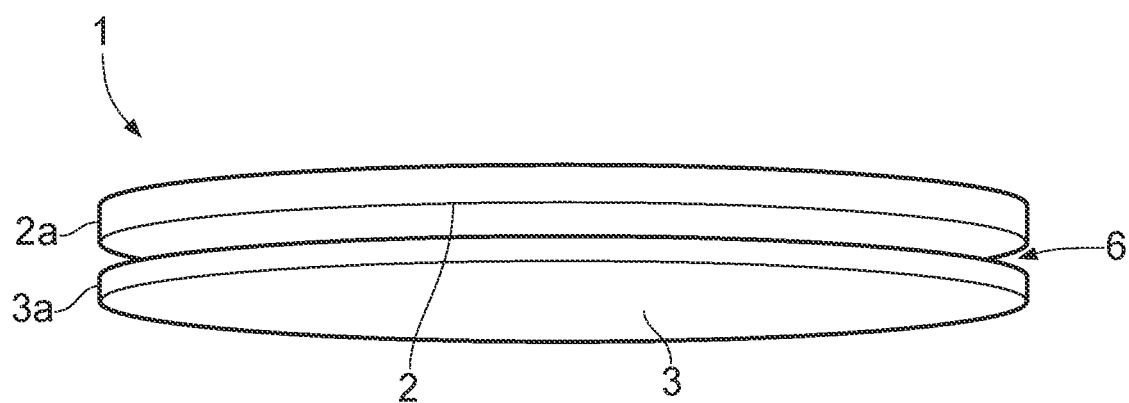
FIG. 3 shows a gap between the discs.

FIGS. 1-3 show a wafer 1 carrying a biological sample 8. The wafer comprises an upper disc 2 and a lower disc 2. A gap 6 between the discs is adapted to receive the biological sample 8.

A circular patch of adhesive tape 4 joins the lower face of the upper disc 2 to the upper face of the lower disc 3 at the centre of the wafer 1. The discs have circular peripheries 2a, 3a at an edge of the wafer 1. The diameter of the wafer may be between 2 cm and 5 cm, for example.

The discs are spaced apart so that the gap 6 provides an annular sample chamber around the adhesive tape. The gap 6 extends from an inner periphery at the circular periphery 4a of the adhesive tape 4 to an open circular outer periphery at the edge of the wafer 1.

The thickness of the tape 4 is carefully controlled so that the size of the gap 6 (as defined by the vertical spacing between the lower face of the upper disc 2 and the upper face of the lower disc 3) is between 2 μm and 5 μm at all points, including at the open circular outer periphery of the gap 6 at the edge of the wafer 1.

The size of the gap 6 is carefully selected so that a liquid biological sample introduced into the edge of the gap is drawn further into the chamber by the capillary effect to form a smear. FIG. 1 shows the edges of a smear 8 which almost completely fills the gap 6.

The size of the gap 6 is selected on the basis of the thickness of sample required. For example a monolayer smear may be required for a full blood test, whereas a thicker film may be required for a malaria test.

Figure 4:
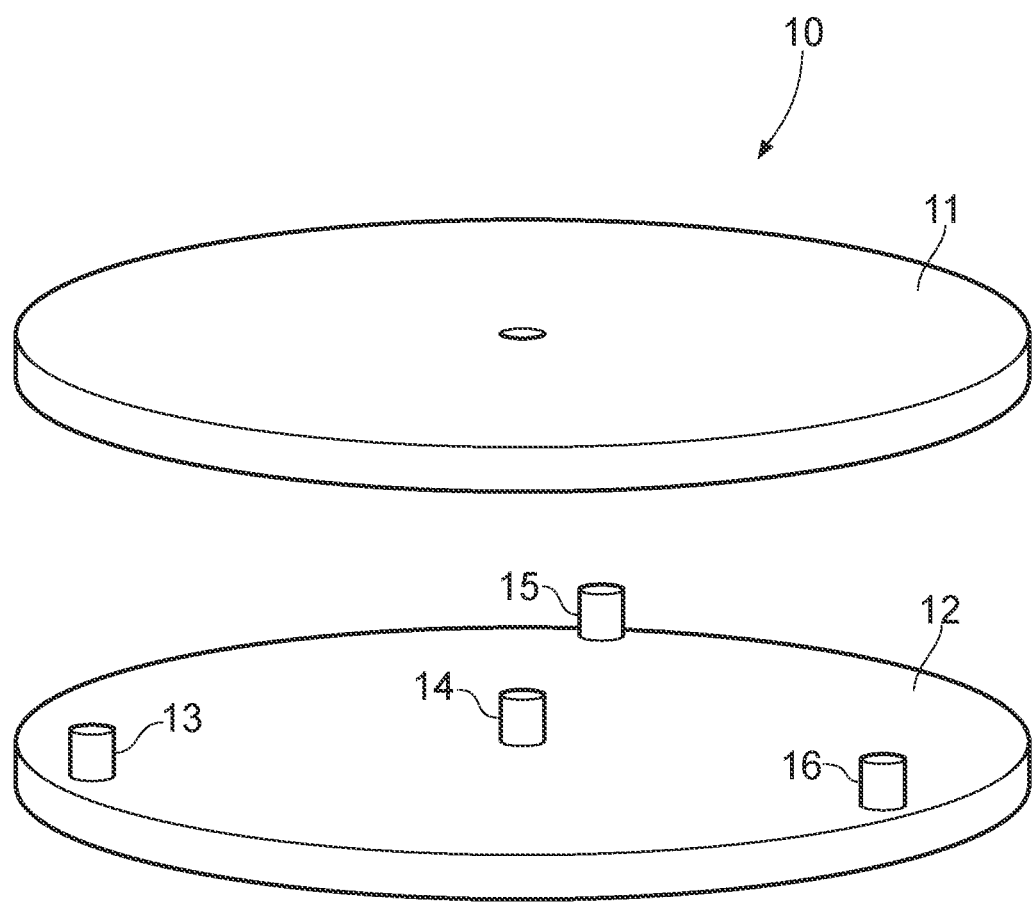
FIG. 4 shows a pair of discs of a wafer with spacers.

An alternative wafer 10 shown in FIG. 4 comprises a pair of circular discs 11, 12. FIG. 4 shows the discs before they are brought together to provide a gap between the discs. The lower disc 12 has four spacers 13-16 which control the size of the gap. When the discs are brought together, the spacers 13-16 contact the underside of the upper disc 11. The discs are held together by adhesive (not shown) on the top of the spacers 13-16.

Figure 5:
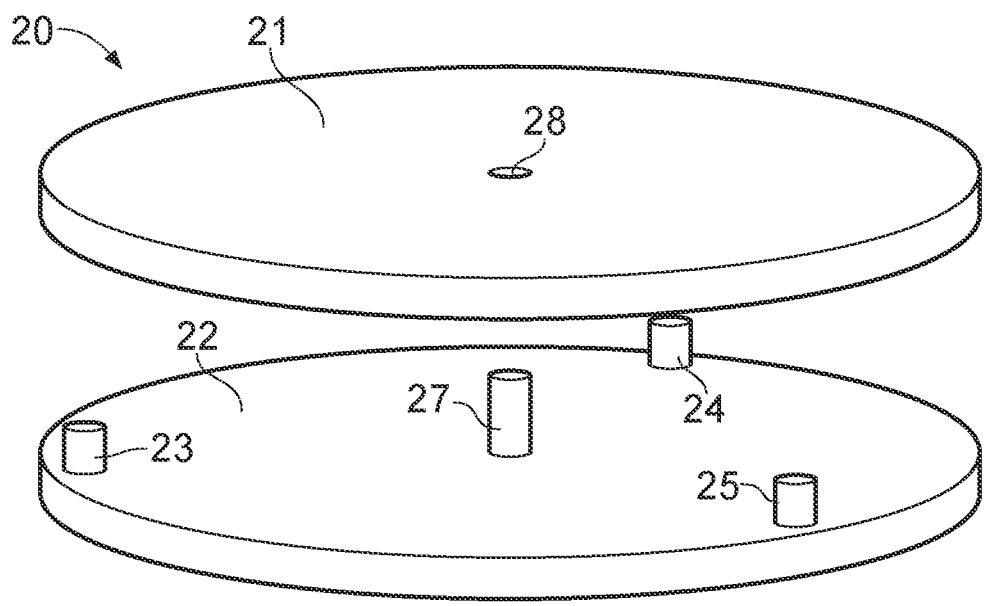
FIG. 5 shows a pair of discs of a wafer with spacers and a joining rod.
Figure 6:
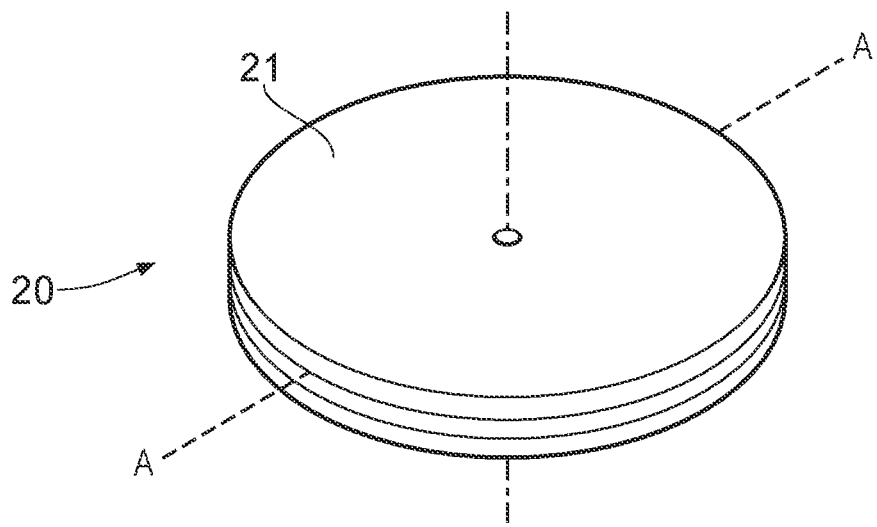
FIG. 6 shows the discs of FIG. 5 in their assembled state.
Figure 7:
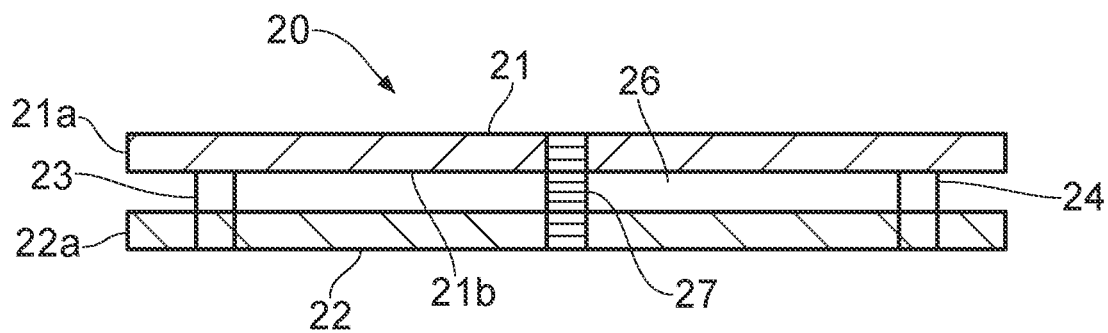
FIG. 7 is a cross-section along a line A-A.

An alternative wafer 20 shown in FIGS. 5-7 comprises a pair of circular discs 21, 22 with circular edges 21a, 22a. FIG. 5 shows the discs before they are brought together to provide a gap 26 between the discs. The lower disc 22 has three spacers 23-25 which control the size of the gap 26. When the discs are brought together, the spacers 23-25 contact the underside 21b of the upper disc 21 as shown in FIG. 7. The discs are held together by a rod 27 which passes through a hole 28 in the upper disc 21 with an interference fit.

Figure 8:
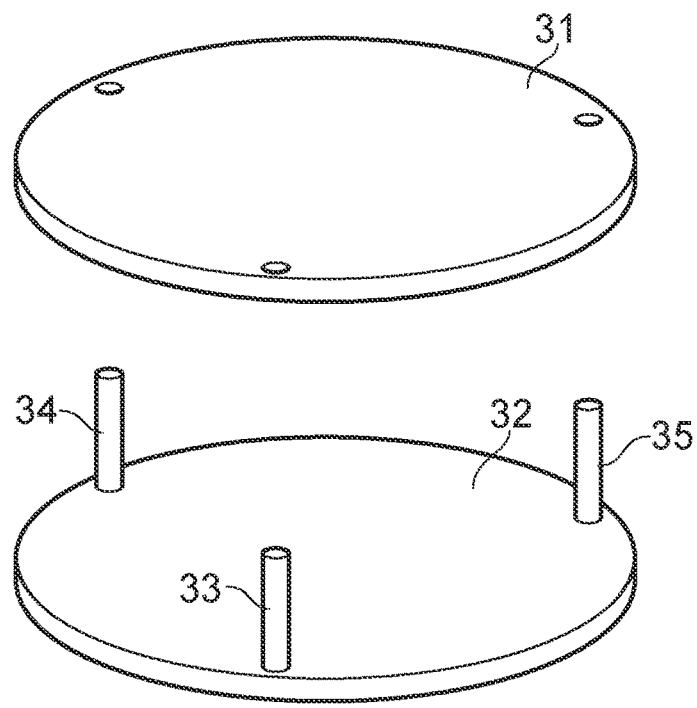
FIG. 8 shows a pair of discs of a wafer with three joining rods.
Figure 9:
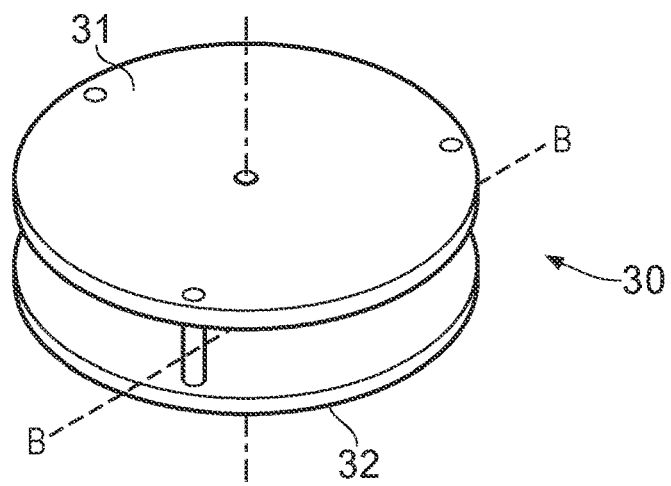
FIG. 9 shows the discs of FIG. 8 in their assembled state.
Figure 10:
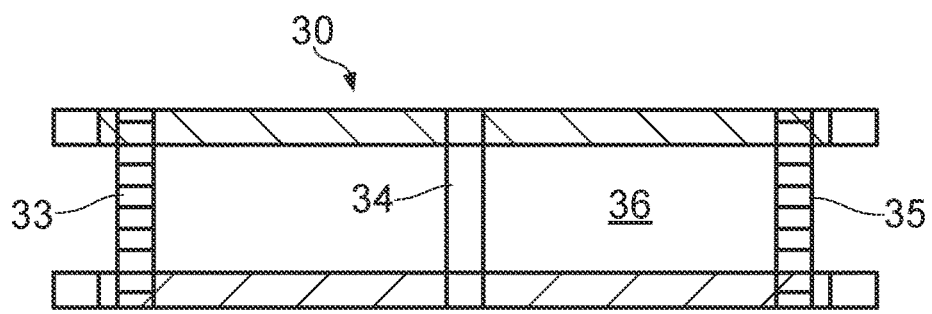
FIG. 10 is a cross-section along a line B-B.
Figure 43:
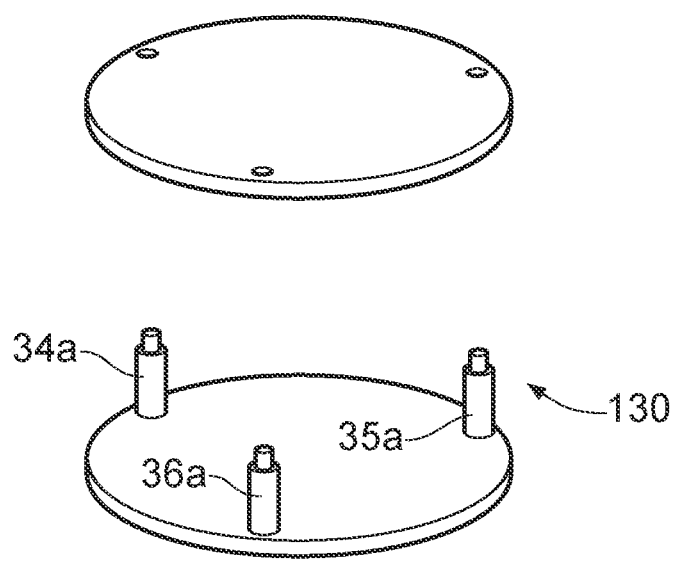
FIG. 43 shows a disassembled wafer having three spacers with annular steps.
Figure 44:
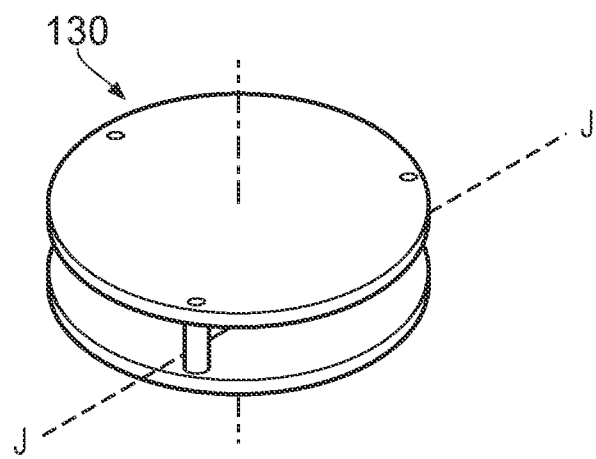
FIG. 44 shows the wafer of FIG. 43 in its assembled state.
Figure 45:
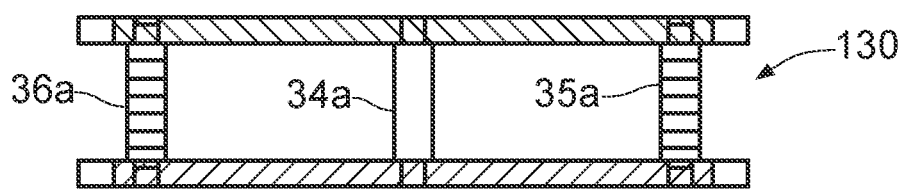
FIG. 45 is a cross-section along the line J-J.

An alternative wafer 30 shown in FIGS. 8-10 comprises a pair of circular discs 31, 32. FIG. 8 shows the discs before they are brought together to provide a gap 36 between the discs. The lower disc 32 has three rods 33-35 which control the size of the gap 36. The rods 33-35 pass through respective holes in the upper disc 31 with an interference fit which holds the discs together. The size of the gap 36 may be controlled by forming the rods 33-35 with annular steps (not shown) which act as a stop. An example of a wafer 130 with rods 33a, 34a, 35a with such a pair of annular steps is shown in FIGS. 43-45.

Figure 11:
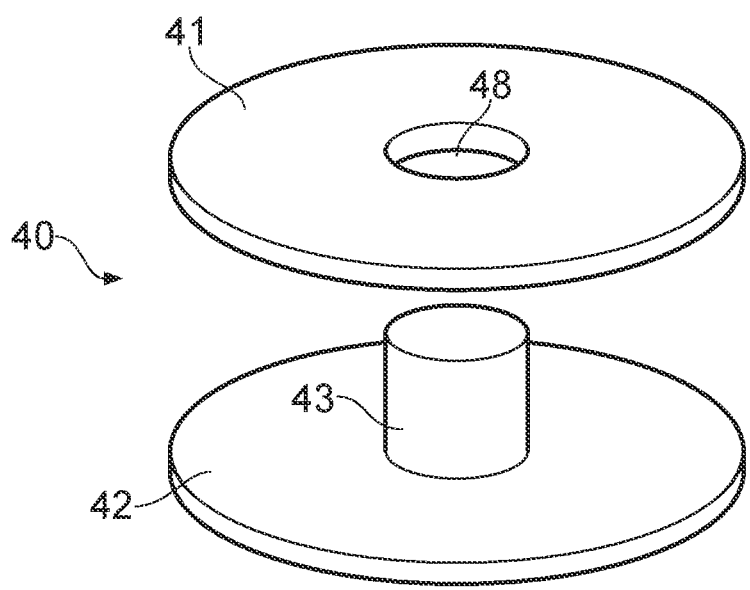
FIG. 11 shows a pair of discs of a wafer with a central joining rod.
Figure 12:
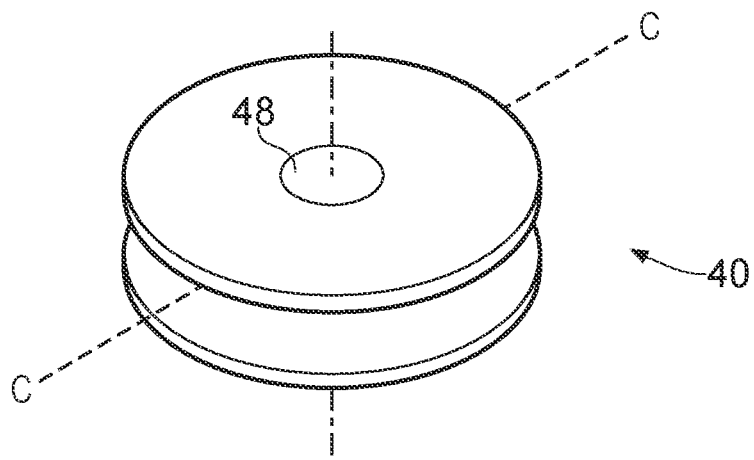
FIG. 12 shows the discs of FIG. 11 in their assembled state.
Figure 13:
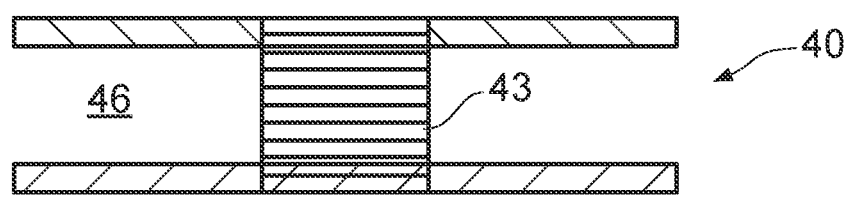
FIG. 13 is a cross-section along a line C-C.
Figure 40:
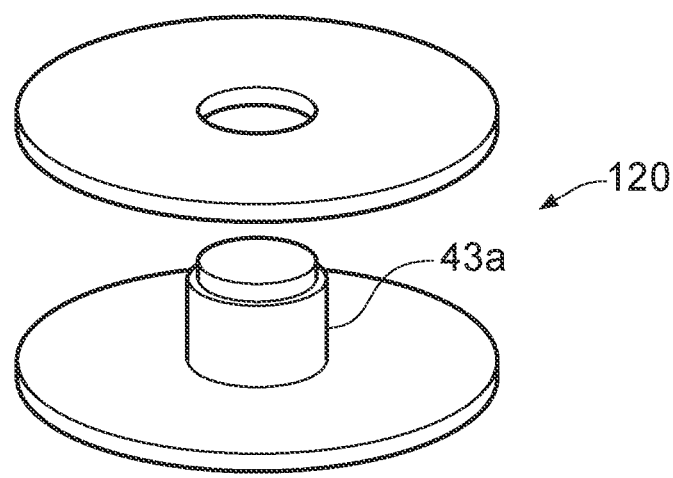
FIG. 40 shows another disassembled wafer having a spacer with a pair of annular steps.
Figure 41:
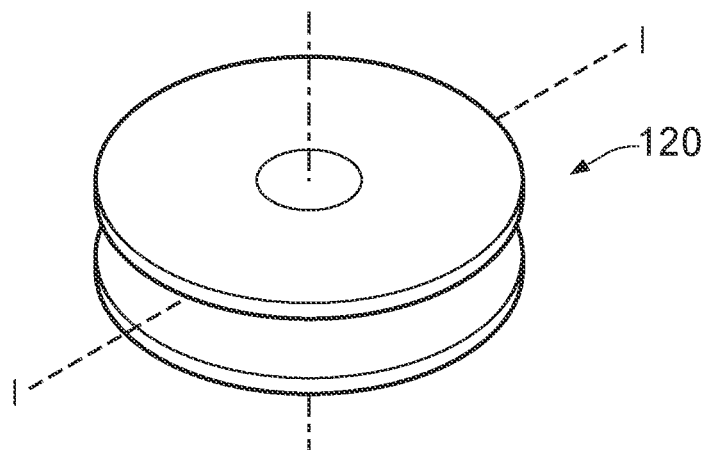
FIG. 41 shows the wafer of FIG. 40 in its assembled state.
Figure 42:
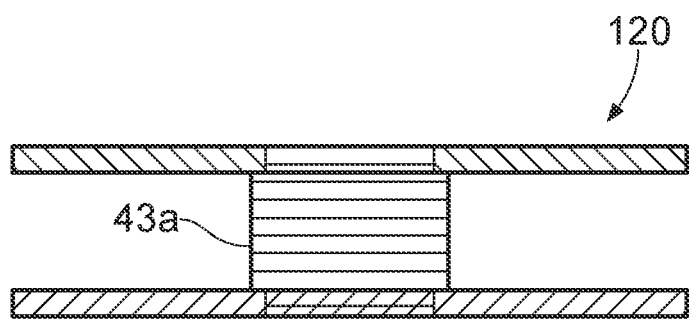
FIG. 42 is a cross-section along the line I-I.

An alternative wafer 40 shown in FIGS. 11-13 comprises a pair of circular discs 41, 42. FIG. 11 shows the discs before they are brought together to provide a gap 46 between the discs. The lower disc 42 has a rod 43 which controls the size of the gap 46. The rod 43 passes through a hole 48 in the upper disc 41 with an interference fit which holds the discs together. The size of the gap 46 may be controlled by forming the rod 43 with an annular step which acts as a stop. An example of a wafer 120 with a central rod 43a with such an annular step is shown in FIGS. 40-42.

Figure 14:
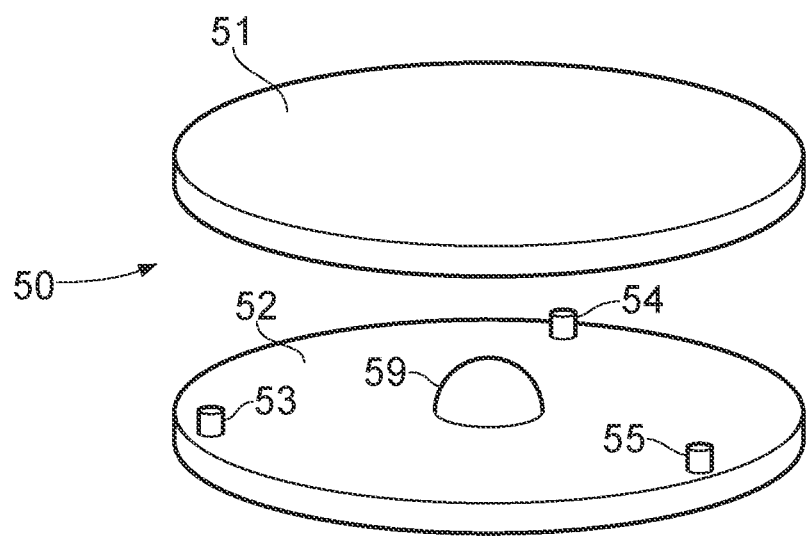
FIG. 14 shows a pair of discs of a wafer with three spacers and an adhesive.
Figure 15:
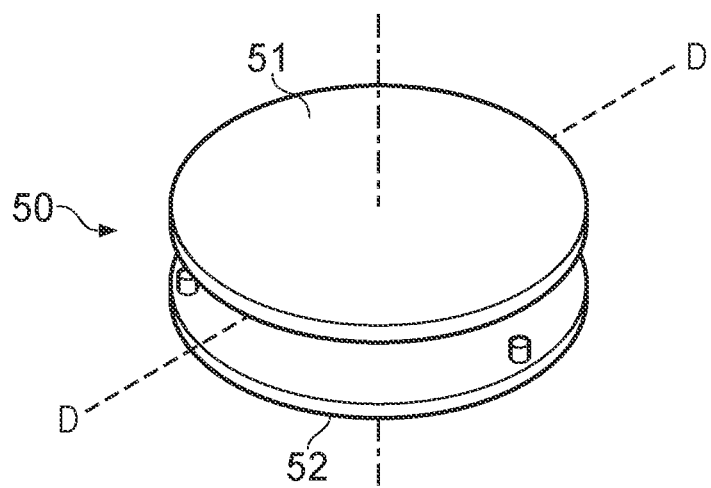
FIG. 15 shows the discs of FIG. 14 in their pre-assembly state.
Figure 16:
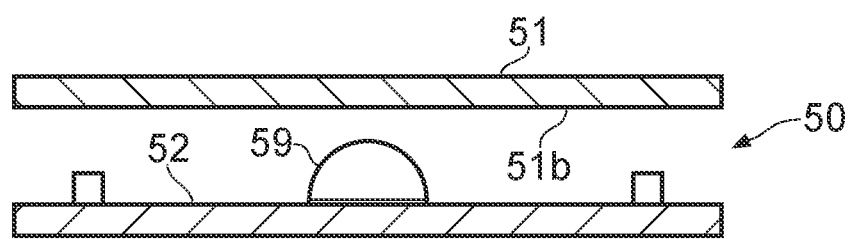
FIG. 16 is a cross-section along a line D-D.

An alternative wafer 50 shown in FIGS. 14-16 comprises a pair of circular discs 51, 52. FIGS. 14-16 all show the discs before they are brought together to provide a gap between them. The lower disc 52 has three spacers 53-55 which control the size of the gap. When the discs are brought together, the spacers 53-55 contact the underside 51b of the upper disc 51.

The discs are held together by an adhesive 59. The adhesive 59 is shown in an uncured liquid state in FIGS. 14 and 16. When the discs are brought together, the adhesive 59 spreads out until the spacers 53-55 contact the underside 51b of the upper disc 51. The adhesive 59 is then cured to secure the discs together.

Figure 17:
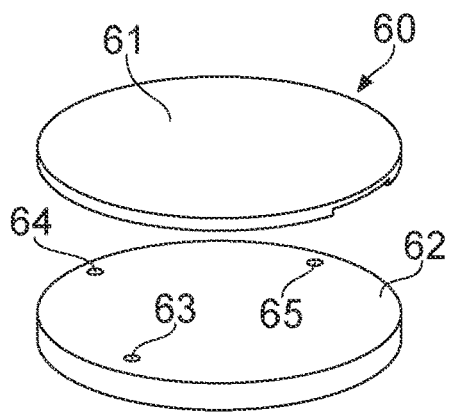
FIG. 17 shows a pair of discs of a wafer with an inlet at its edge.
Figure 18:
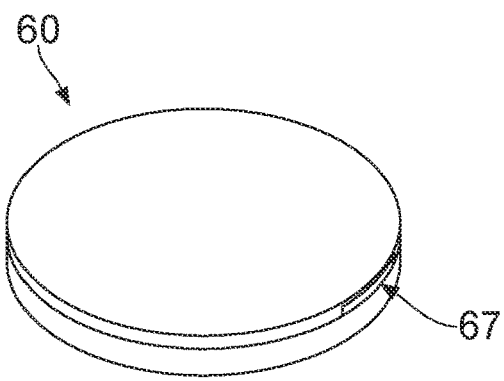
FIG. 18 shows the discs of FIG. 17 in their assembled state.
Figure 19:
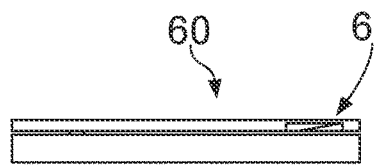
FIG. 19 is a side view of the wafer of FIG. 18.
Figure 20:
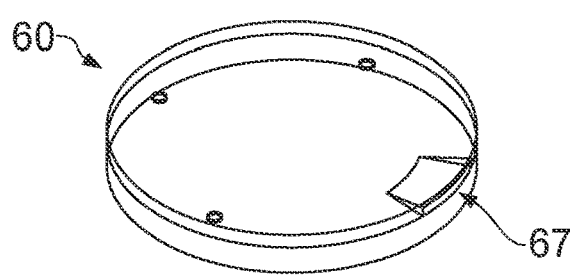
FIG. 20 shows hidden internal parts of the wafer of FIG. 18.
Figure 21:
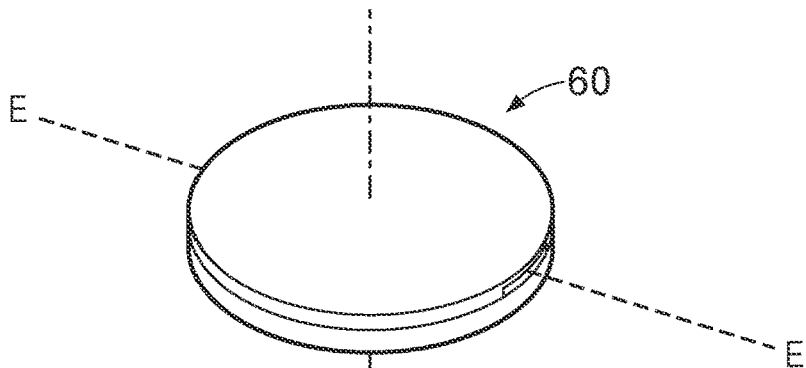
FIG. 21 shows the wafer of FIG. 18 with a section line E-E.

An alternative wafer 60 shown in FIGS. 17-22 comprises a pair of plates 61, 62 in the form of a pair of circular discs 61, 62. FIG. 17 shows the discs before they are brought together to provide a gap 66 between them. The lower disc 62 has three spacers 63-65 which control the size of the gap. When the discs are brought together, the spacers 63-65 contact the underside 61b of the upper disc 61.

Figure 22:
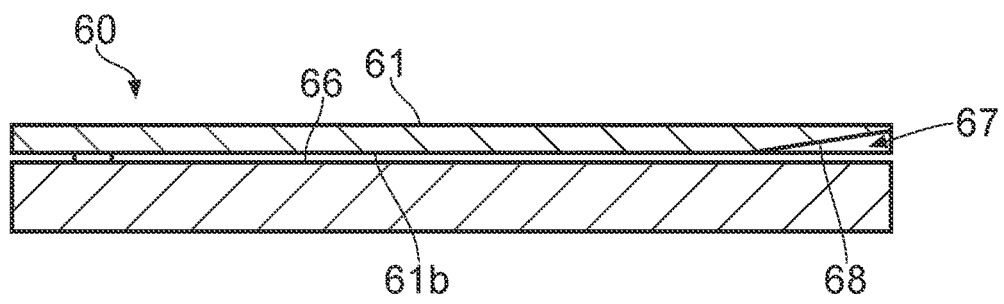
FIG. 22 is a cross-section along the line E-E.
Figure 23:
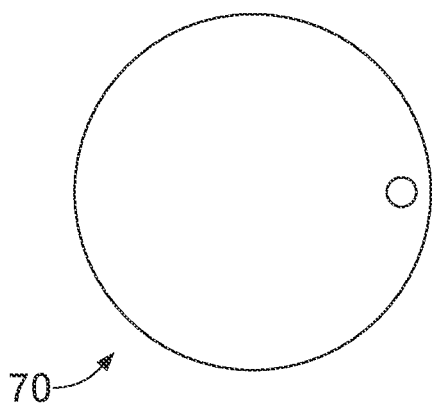
FIG. 23 is a plan view of a wafer with a through-hole inlet at its edge.
Figure 24:
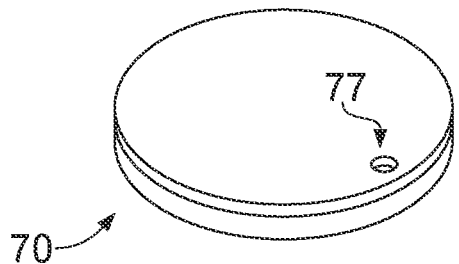
FIG. 24 is an isometric view of the wafer of FIG. 23.
Figure 25:
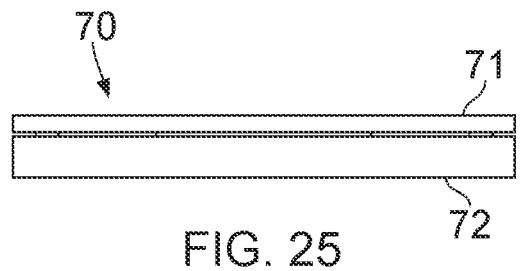
FIG. 25 is a side view of the wafer of FIG. 23.
Figure 26:
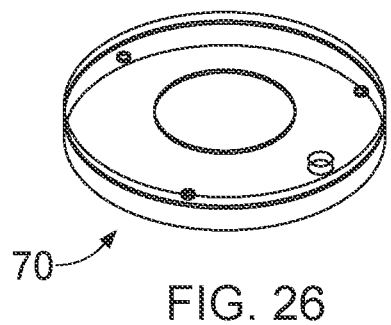
FIG. 26 shows hidden internal parts of the wafer of FIG. 24.

A first one of the discs (in this case the upper disc 61, although it could be the lower disc 62) has an opening which provides an inlet 67 into the gap 66 as shown most clearly in FIG. 22.

The opening is in the form of a tapered recess in the underside 61b of the upper disc 61. The tapered recess has an angled face 68 shown in FIG. 22. The tapered recess extends to an edge of the upper disc 61.

The tapered recess becomes progressively shallow away from the edge of the upper disc 61. As shown in FIG. 22, the tapered recess has a pair of ends: a relatively deep outer end at the edge of the upper disc 61; a relatively shallow inner end opposite the outer end; a base (the angled face 68) which runs between the outer end and the inner end, and an open lower side opposite the angled face 68 which faces the lower disc 62. The open lower side of the tapered recess enables fluid to flow sideways out of the tapered recess and into the gap 66 between the discs. Fluid can also flow radially into the gap 66 from the inner end of the tapered recess.

In the embodiment of FIGS. 17-22 the tapered recess extends only part way to the centre of the upper disc 61. In other embodiments, the tapered recess may extend further, for instance to the centre of the upper disc 61.

In the embodiment of FIGS. 17-22 the tapered recess becomes progressively and continuously shallower along its full radial extent, but in other examples it may only taper along part of its radial extent, or it may taper in a series of steps.

In the embodiment of FIGS. 17-22 each circular disc 61, 62 is a plate with an edge that is circular around a full circumference of the disc. In other embodiments, one or both of the circular discs 61, 62 may have an edge which is circular around a majority of the circumference of the disc, but flat or indented at certain places. For example the upper disc 61 may have a small flat or indent at the position of the inlet 67.

In other embodiments, the circular discs 61, 62 may be replaced by plates with non-circular edges—for instance plates with octagonal edges, rectangular edges or any other shape.

Figure 27:
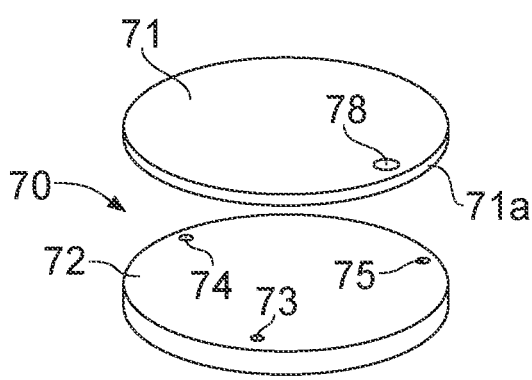
FIG. 27 shows the wafer of FIG. 18 with a section line E-E.
Figure 28:
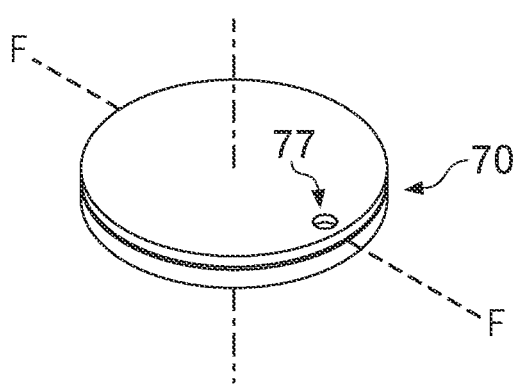
FIG. 28 shows the wafer of FIG. 24 with a section line F-F.

An alternative wafer 70 shown in FIGS. 23-29 comprises a pair of circular discs 71, 72. FIG. 27 shows the discs before they are brought together to provide a gap 76 between them. The lower disc 72 has three spacers 73-75 which control the size of the gap. When the discs are brought together, the spacers 73-75 contact the underside 71b of the upper disc 71.

Figure 29:
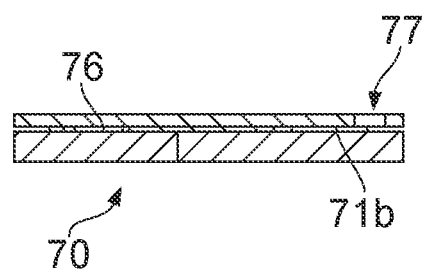
FIG. 29 is a cross-section along the line F-F.

One of the discs (in this case the upper disc 71, although it could be the lower disc 72) has an opening which provides an inlet 77 into the gap 76 as shown most clearly in FIG. 29. This inlet 77 helps to load more of the sample into gap 76, and helps break the surface tension of the sample which make it easier to introduce into the gap 76.

As shown in FIG. 27, the opening is in the form of a circular through-hole 78 which extends through a thickness of the upper disc 71 towards an edge 71a of the upper disc 71.

Figure 30:
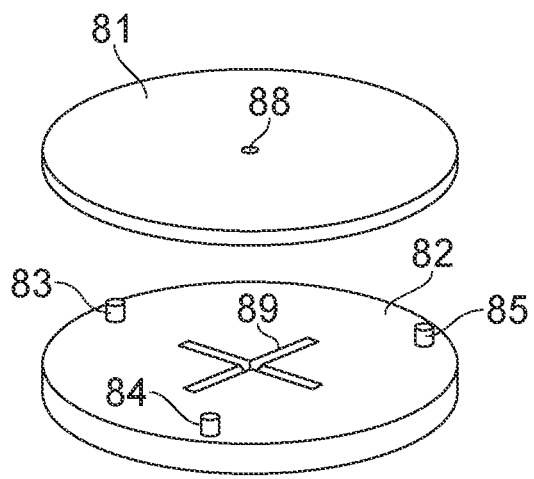
FIG. 30 shows a pair of discs of a wafer with a through-hole inlet and set of channels.
Figure 31:
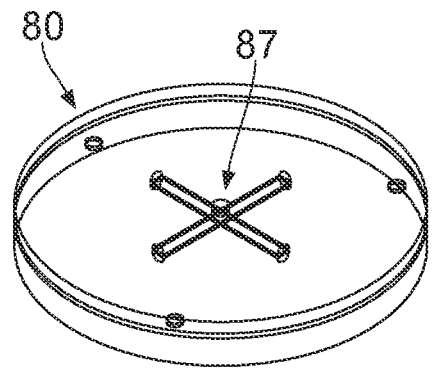
FIG. 31 shows hidden internal parts of the wafer.
Figure 32:
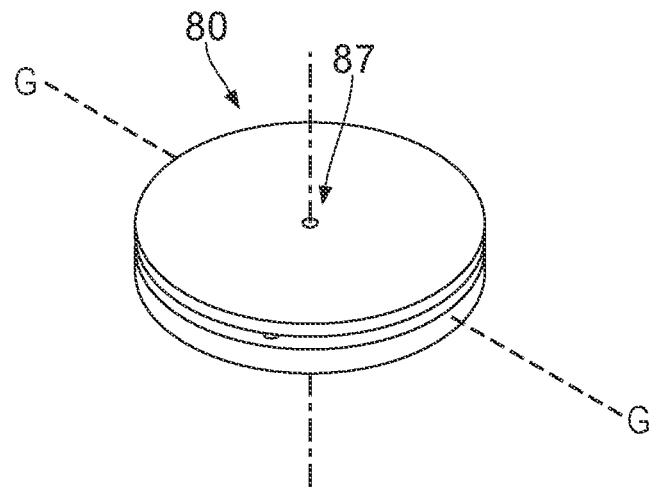
FIG. 32 shows the wafer of FIG. 31 with a section line G-G.
Figure 33:
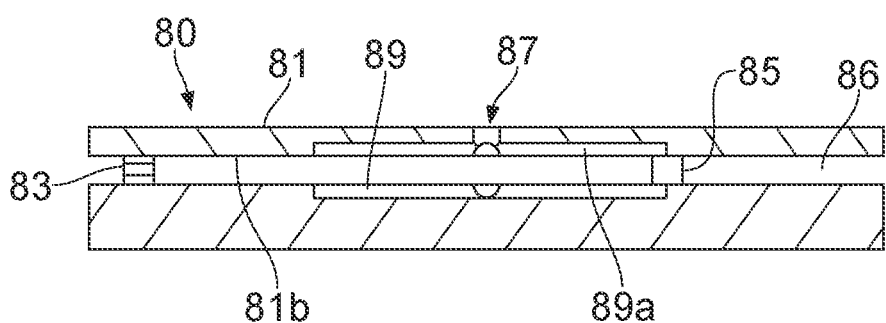
FIG. 33 is a cross-section along the line G-G.

An alternative wafer 80 shown in FIGS. 30-33 comprises a pair of circular discs 81, 82. FIG. 30 shows the discs before they are brought together to provide a gap 86 between them. The lower disc 82 has three spacers 83-85 which control the size of the gap. When the discs are brought together, the spacers 83-85 contact the underside 81b of the upper disc 81 as shown in FIG. 33.

One of the discs (in this case the upper disc 81, although it could be the lower disc 82) has an opening which provides an inlet 87 into the gap 86 as shown most clearly in FIG. 33. This inlet 87 helps to load more of the sample into gap 86, and helps break the surface tension of the sample which make it easier to introduce into the gap 86.

As shown in FIG. 30, the opening is in the form of a circular drilled through-hole 88 which extends through a thickness of the upper disc 81 at the centre of the upper disc 81.

The upper face of the lower disc 82 is engraved with a set of semi-circular channels 89 shown in FIG. 30 which extend radially away from the centre of the disc 82. The lower face 81b of the upper disc 81 is engraved with a mirror-image set of semi-circular channels 89a shown in FIG. 33 which extend radially away from the through-hole 88 at the centre of the disc 82.

The sample is injected into the gap 86 via the inlet 87, and then flows from the inlet 76 along the channels 89, 89a and into the gap 86.

Figures 34, 35:
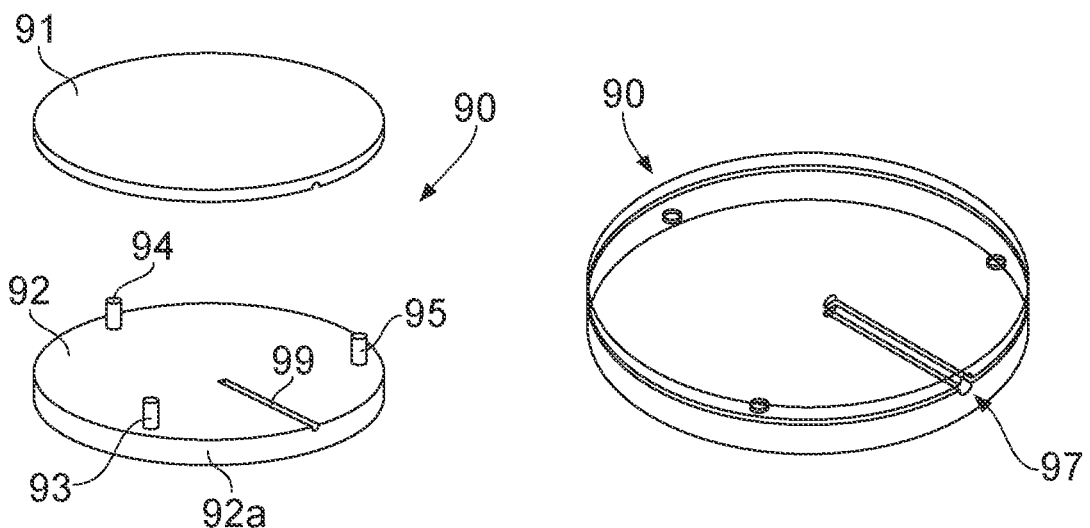
FIG. 34 shows a pair of discs of a wafer with an edge channel.
FIG. 35 shows hidden internal parts of the wafer.
Figure 36:
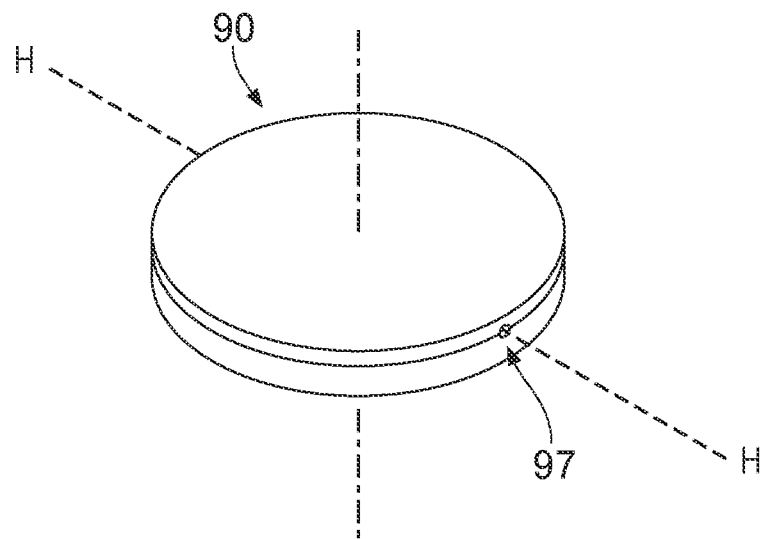
FIG. 36 shows the wafer of FIG. 35 with a section line H-H.
Figure 37:
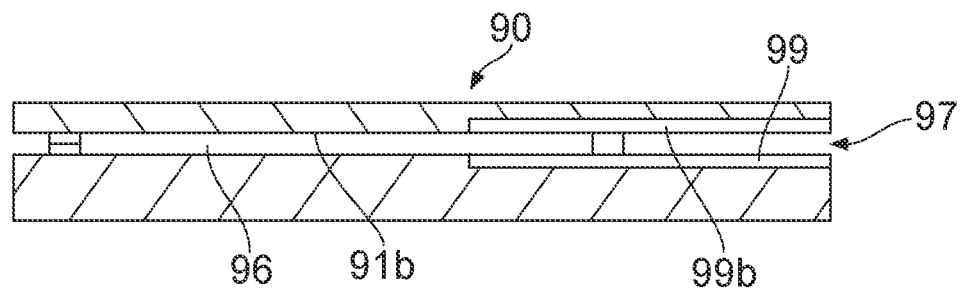
FIG. 37 is a cross-section along the line H-H.

An alternative wafer 90 shown in FIGS. 34-37 comprises a pair of plates 91, 92. The plates 91, 92 are circular discs, comprising a first (lower) disc 92 and a second (upper) disc 91. FIG. 34 shows the discs before they are brought together to provide a gap 96 between them. The lower disc 92 has three spacers 93-95 which control the size of the gap. When the discs are brought together, the spacers 93-95 contact the underside 91b of the upper disc 91 as shown in FIG. 37.

The upper face of the lower disc 92 is engraved with a first semi-circular channel 99 shown in FIG. 34 which extends radially away from the centre of the disc 92 all the way to the edge 92a of the disc 92. The lower face 91b of the upper disc 91 is engraved with a second mirror-image semi-circular channel 99b shown in FIG. 37.

When the discs are brought together, the channels 99, 99b are aligned with each other and provide an inlet 97 with a generally circular cross-section as shown in FIGS. 35 and 36. The sample is injected into the gap 96 via the inlet 97.

Each channel 99, 99b is in the form of a notch or recess in a respective face of one of the discs. As shown in FIG. 37, each notch or recess has an outer end at the edge of the respective one of the discs; an inner end opposite the outer end; a rounded base which runs radially between the outer end and the inner end; and an open side opposite the rounded base.

The open side of the notch or recess enables fluid to flow sideways out of the channel 99, 99b and into the gap 96 between the discs. Fluid can also flow radially into the gap from the inner end of the channel 99, 99b.

The discs 91, 92 must be brought together with the correct relative angular orientation, so the channels 99, 99b are aligned with each other. The embodiment of FIG. 17-22 has an inlet 67 formed by a recess in only one of the discs (the upper disc 61), the other one of the discs (the lower disc 62) having a face which is planar and un-recessed where it faces the recess. This arrangement is beneficial for manufacturing purposes, because it means that the discs 61, 62 can be brought together with any relative angular orientation.

In the embodiment of FIGS. 34-37 each circular disc 91, 92 is a plate with an edge that is circular around a full circumference of the disc. In other embodiments, one or both of the circular discs may have an edge which is circular around a majority of the circumference of the disc, but flat or indented at certain places. For example each disc 91, 92 may have a small flat or indent at the position of the inlet 97. In other embodiments, the circular discs 91, 92 may be replaced by plates with non-circular edges—for instance octagonal edges, rectangular edges or any other shape.

In all of the examples shown above, the discs have opposed parallel planar surfaces on opposite sides of the gap. The size of the gap is ideally constant across the full diameter of the wafer, for example varying by no more than 10% across the full diameter of the wafer.

The size of the gap is ideally tightly controlled, and typical gap sizes are given below in Table 1. Where the size of the gap varies across the wafer, then the size of the gap in Table 1 may refer to a mean size of the gap, a maximum size of the gap, a size of the gap at the open circular outer periphery of the gap, or a size of the gap where the inlet meets the gap.

TABLE 1

| Fluid | Feature | Purpose | Gap size |
|---|---|---|---|
| Whole blood | Capillary action and cell monolayer | Cell examination and counting | Less than 10 μm or less than 5 μm. More than 2 μm |
| Whole blood | Capillary action and cell multilayer | Less fine-grained purposes such as Malaria detection | Less than 50 μm or less than 100 μm. More than 2 μm |
| Other biological fluids (animal or human) | Capillary action | Multi-purpose | Less than 200 μm. More than 2 μm |

The gap is sized to pull a biological sample into the gap by capillary action. In the case of a sample of whole blood, blood cells have a thickness at their thickest point between 2 μm and 2.5 μm. So if the gap has a size less than 4 μm or 5 μm then the sample may be pulled into the gap by capillary action to form a cell monolayer.

Figure 38:
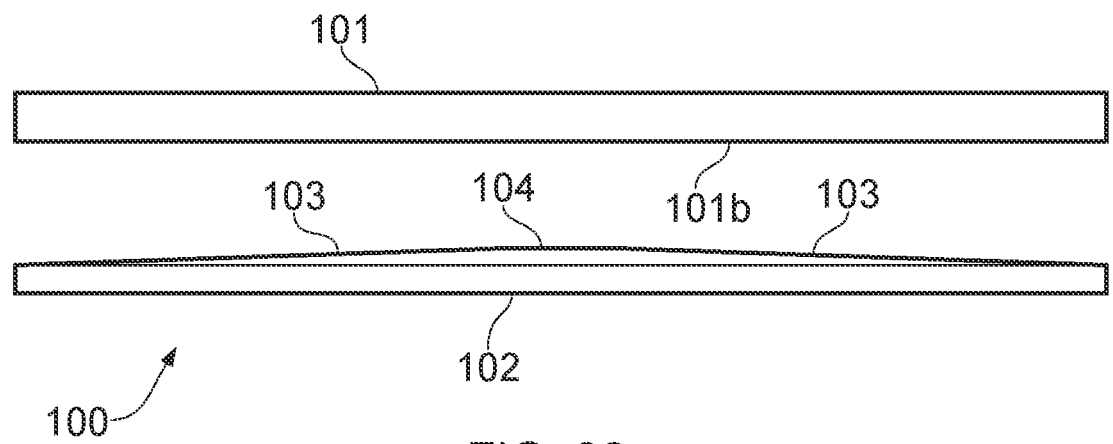
FIG. 38 shows a pair of discs for assembling a wafer with a varying sized gap.

An alternative wafer 100 shown in FIG. 38 comprises a pair of circular discs 101, 102. FIG. 38 shows the discs before they are brought together to provide a gap between them.

The upper side of the lower disc 102 has a frustoconical surface 103 and a flat centre 104. The upper disc 101 has a flat underside 101b. When the discs are brought together, the flat centre 104 of the lower disc contacts the underside 101b of the upper disc. Spacers (not shown) may be provided to control the gap between the discs. The flat centre 104 may be joined to the underside 101b of the upper disc by adhesive, or other joining methods.

The frustoconical surface 103 results in a gap with a size which increases radially to a maximum at a circular open periphery of the gap at an edge of the wafer.

The gap may be sized so that only small cellular or molecular elements can fit into the narrow part of the gap at the centre (such as cells, proteins, antibodies, pathogens, or others) whereas larger cells can only fit into the wide part of the gap at the edge.

The wafer 100 may be spun to help pre-sort molecular elements in the wafer.

Figure 39:
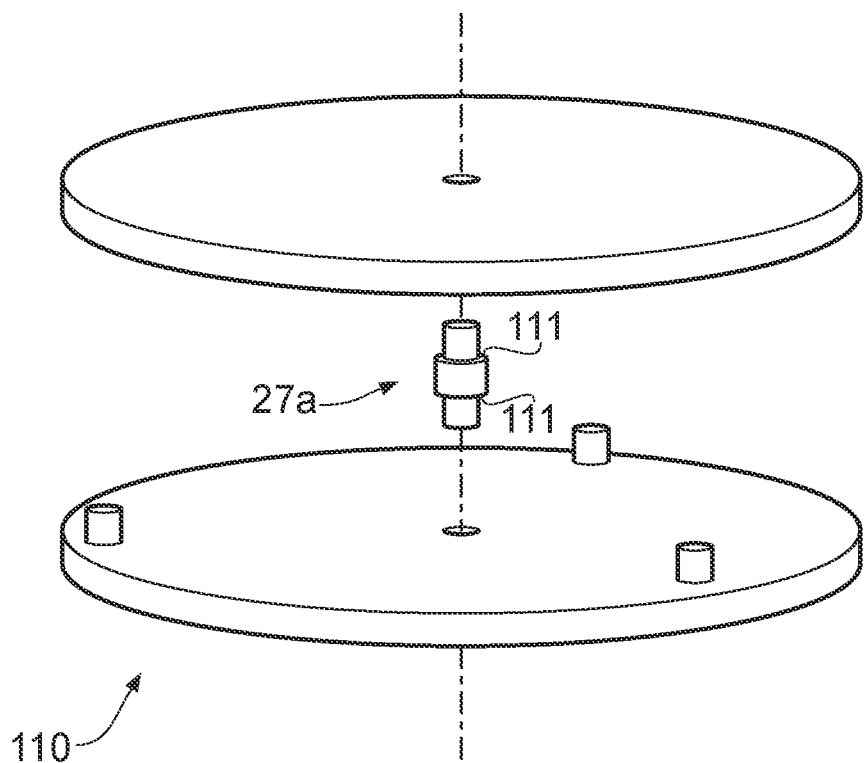
FIG. 39 shows a disassembled wafer having a spacer with a pair of annular steps.

FIG. 39 shows a disassembled wafer having a central rod with a pair of annular steps. The wafer of FIG. 39 is similar to the wafer of FIGS. 5-7, the only difference being that the central rod 27a passes through a hole in the upper disc with an interference fit, and also passes through a hole in the lower disc with an interference fit. The central rod has a pair of annular steps 111 which act as stops against the upper and lower discs so the central rod 27a acts as a spacer.

As described above, a biological sample is loaded into the wafer by introducing the sample into the gap so that the sample is pulled into the gap by capillary action. In some examples, one or both of the discs has an opening which provides an inlet into the gap, and the sample is introduced into the gap via the opening.

In some of the embodiments described above, each disc has a circular periphery at an edge of the wafer (for example edges 2a, 3a in the case of FIG. 3), and the gap has a circular open outer periphery at an edge of the wafer. The circular open outer periphery of the gap either extends around all of a circumference of the wafer, or around most of the circumference where spacers are provided at the edge of the wafer (such as the spacers 13-15 in FIG. 4).

Note that the Figures are not to scale, the size of the gap being exaggerated in the Figures to make the gap visible.

In the cases where an inlet 67, 77, 87, 97 is not provided, then the biological sample can be loaded into the wafer by introducing the sample into the edge of the gap at any point around the circumference of the wafer. Where an inlet 67, 77, 87, 97 is provided, the inlet may help to load more of the sample into the gap, and/or may help break the surface tension of the sample which make it easier to introduce into the gap.

In the cases where an inlet is not provided (i.e. the embodiments of FIGS. 1-16, and FIGS. 38-45) then inlets similar to the inlets 67, 77, 87, 97 may optionally be added.

In the Figures, the gap is an air gap, but optionally the gap may contain a stain, dye or other reagent which fully or partially fills the gap. The sample then comes into contact with the dye or reagent as it is pulled into the gap.

In some implementations, the dye is a dry dye. In some implementations, the dry dye includes methylene blue and/or eosin, cresyl violet or some other staining product, including those related to immunofluorescence assays.

The dye or other reagent(s) can be provided in the gap in a various ways. In one example, a small quantity of dye (e.g., about 5 uL of the dye) is loaded into the gap before the sample, so the sample comes into contact with the dye as it flows into the gap. In another example, stain, dye or other reagent is mixed with the sample before the sample is loaded into the gap. In another example, the stain, dye or other reagent is smeared on the internal face of one or both of the disks by a traditional smearing mechanism or spraying, before the wafer is assembled by bringing the discs together.

In some implementations, an external test tube is configured with anticoagulant to prepare a stained sample as an intermediate step before depositing the sample in the wafer.

Examples of biological samples which can be loaded into the wafer include: whole blood; sub-products of blood such as buffy coat, plasma or red blood cells; fine needle biopsy samples (e.g. surgical biopsy, fine needle biopsy, etc.); urine; semen; amniotic fluid; saliva; milk; bronchial lavage; cerebrospinal fluid; peritoneal fluid; faeces; bone marrow; serum; sputum; synoidal fluid; tears; vaginal fluid; nasal fluid; sweat; pleural fluid; tissue explant; organ culture; cell culture; or any other tissue or cell preparation, or fraction or derivative thereof or isolated therefrom. The sample may be from a host organism.

For all of the embodiments above, the upper disc is transparent (for instance made of glass or acrylic material) and the lower disc is either transparent, opaque or reflective. This enables the sample to be imaged by a camera through the upper disc. If the lower disc is also transparent (for instance made of glass or acrylic material) then the sample can be lit from below through the lower disc.

Figure 46:
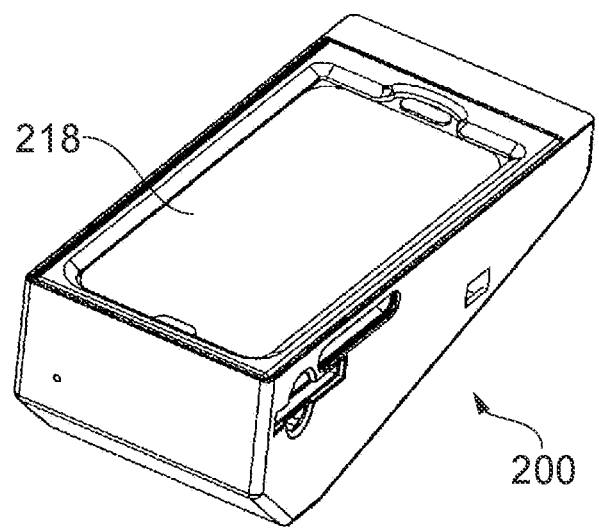
FIG. 46 shows a portable device for imaging biological sample.
Figure 47:
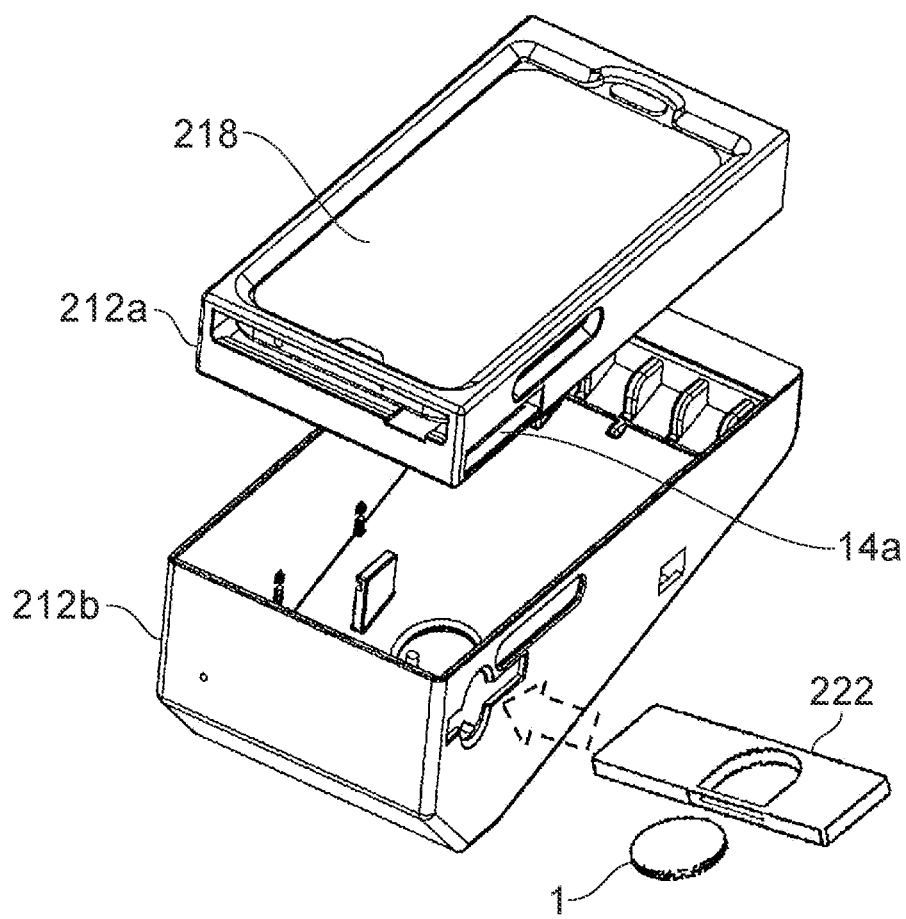
FIG. 47 shows the portable device of FIG. 46 in a disassembled state along with a wafer and cartridge which can be inserted into the device.

Once the wafer has been loaded with a biological sample, then a portable device 200 shown in FIG. 46 may be used to image the biological sample in the gap. The portable device comprises a camera 218; and a casing configured to receive the wafer at an imaging location inside the casing. As shown in FIG. 47, the casing consists of a top part 212a and bottom part 212b. The camera 218 may be a smartphone, for example.

Inside the casing, a rotary driver (not shown) is configured to rotate the wafer at the imaging location between a series of orientations, each orientation bringing a different area of the biological sample into a field of view of the camera.

A cartridge 222 shown in FIG. 47 carries the wafer 1. The cartridge 222 has a window and a slot through which the wafer 1 can be slid into the window where it is supported from below by a ledge. The cartridge 222 carrying the wafer 1 is then inserted into the casing 12a, 12b via a slot in the casing as indicated.

The compact circular shape of any of the above-described wafers makes them particularly suited for use in such a portable device 200.

The invention claimed is:

1. A wafer for carrying a biological sample, the wafer comprising: a pair of circular discs, wherein at least one of the discs is transparent; one or more spacers between the discs; and a gap between the discs adapted to receive a biological sample, wherein one of the discs has an opening which provides an inlet into the gap, and the opening comprises a recess, notch or channel in an edge of the one of the discs at an outer circumference of the wafer.

2. The wafer of claim 1, wherein the gap is sized to pull a biological sample into the gap by capillary action.

3. The wafer of claim 1, wherein a size of the gap is less than 200 μm.

4. The wafer of claim 1, wherein a size of the gap is less than 20 μm.

5. The wafer of claim 1, wherein a size of the gap is greater than 1 μm or greater than 2 μm.

6. The wafer of claim 4, wherein the size of the gap is a mean size of the gap, a maximum size of the gap, a size of the gap at an open circular outer periphery of the gap, or a size of the gap where the inlet meets the gap.

7. The wafer of claim 1, wherein the one or more spacers comprise an adhesive tape which joins the discs together.

8. The wafer of claim 1, wherein the one or more spacers comprise three or more spacers.

9. The wafer of claim 1, wherein the gap extends across a full diameter of the wafer.

10. The wafer of claim 1, wherein the discs are joined together.

11. A wafer for carrying a biological sample, the wafer comprising: a pair of plates, wherein at least one of the plates is transparent; and a gap between the plates adapted to receive a biological sample, wherein a first one of the plates has an opening which provides an inlet into the gap, the opening comprises a recess in a face of the first one of the plates, and the recess extends to an edge of the first one of the plates at an outer edge of the wafer, and wherein the recess has: an outer end at the edge of the first one of the plates; an inner end opposite the outer end; a base which runs between the outer end and the inner end; and an open side opposite the base.

12. The wafer of claim 11, wherein the recess comprises a tapered recess which becomes progressively shallow away from the edge of the first one of the plates.

13. The wafer of claim 11, wherein the first one of the plates is a disc, and the edge of the first one of the plates is circular around at least a majority of its circumference.

14. A method of loading a biological sample into a wafer according to claim 1, the method comprising introducing the sample into the gap via the opening so that the sample is pulled into the gap by capillary action.

15. The method of claim 14, wherein the sample is pulled into the gap by capillary action to form a cell monolayer.

16. A wafer for carrying a biological sample, the wafer comprising: a pair of circular discs, wherein at least one of the discs is transparent; and a gap between the discs adapted to receive a biological sample and extending across a full diameter of the wafer, wherein one of the discs has an opening which provides an inlet into the gap, and the opening comprises a recess, notch or channel in an edge of the one of the discs at an outer circumference of the wafer.

17. A wafer for carrying a biological sample, the wafer comprising: a pair of plates, wherein at least one of the plates is transparent; and a gap between the plates adapted to receive a biological sample, wherein a first one of the plates has an opening which provides an inlet into the gap, the opening comprises a recess in a face of the first one of the plates, the recess extends to an edge of the first one of the plates at an outer edge of the wafer, and the recess comprises a tapered recess which becomes progressively shallow away from the edge of the first one of the plates.

18. A wafer for carrying a biological sample, the wafer comprising: a pair of plates, wherein at least one of the plates is transparent; and a gap between the plates adapted to receive a biological sample, wherein a first one of the plates has an opening which provides an inlet into the gap, the opening comprises a recess in a face of the first one of the plates, the recess extends to an edge of the first one of the plates at an outer edge of the wafer, and the recess extends radially.

19. A wafer for carrying a biological sample, the wafer comprising: a pair of plates, wherein at least one of the plates is transparent; and a gap between the plates adapted to receive a biological sample, wherein a first one of the plates has an opening which provides an inlet into the gap, the opening comprises a recess in a face of the first one of the plates, the recess extends to an edge of the first one of the plates at an outer edge of the wafer, and a second one of the plates has a face which is un-recessed where it faces the recess.

20. A wafer for carrying a biological sample, the wafer comprising: a pair of plates, wherein at least one of the plates is transparent; and a gap between the plates adapted to receive a biological sample, wherein a first one of the plates has an opening which provides an inlet into the gap, the opening comprises a first recess in a face of the first one of the plates, the first recess extends to an edge of the first one of the plates at an outer edge of the wafer, and the wafer further comprises a second recess in a face of the second one of the plates, and the second recess is aligned with the first recess.

* * * * *